United States Patent Office 2,811,513
Patented Oct. 29, 1957

2,811,513

FLUOROISOPROPENYL ALKYL SULFONES AND POLYMERS THEREOF

Hubert M. Hill, Kingsport, Tenn., assignor to Eastman Kodak Company, Rochester, N. Y., a corporation of New Jersey No Drawing. Application April 7, 1955,
Serial No. 500,011

12 Claims. (Cl. 260—79.3)

This invention relates to fluoroisopropenyl alkyl sulfones, to polymers thereof, and to a method for their preparation.

The new compounds of the invention are represented by the following general structural formula:

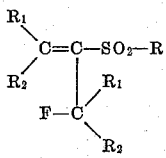

wherein R represents an alkyl group containing from 1 to 4 carbon atoms, and $R_1$ and $R_2$ each represents an atom of hydrogen or a fluorine atom. The preferred new compounds are represented by the following general structural formula:

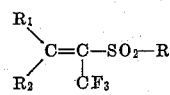

wherein R, $R_1$ and $R_2$ are as above defined. The above defined compounds are valuable intermediates for the preparation of resinous homopolymers and copolymers thereof which are characterized by high softening points and good solubility in common organic solvents. They can be molded, extruded or coated from their solutions to give shaped articles and films that are tough and clear, that are flame resistant and show high heat distortion temperatures. Those copolymers containing acrylonitrile are especially useful for preparing tough and dyeable fibers.

It is, accordingly, an object of the invention to provide a new class of unsaturated monomeric compounds. Another object is to provide resinous polymers of the same. Another object is to provide a process for preparing the new compounds. Other objects will become apparent hereinafter.

In accordance with my invention, I prepare the fluoroisopropenyl alkyl sulfones defined above by reacting certain fluoroacetones, i. e. those containing at least one hydrogen atom and from 1 to 5 fluorine atoms, first with an alkylmercaptan in the presence of a hydrogen halide to obtain the mercapto derivative, then treating this product with a carboxylic acid halide to obtain the ester thereof, followed by oxidation to convert the sulfur atoms to sulfone groupings and then pyrolyzing to split off acetic acid thereby forming the unsaturated compounds of the invention. The steps of the process are illustrated below employing as starting material 1,1,1-trifluoroacetone which gives the simplest of the preferred compounds of the invention, namely, 1,1,1-trifluoroisopropenyl alkyl sulfones:

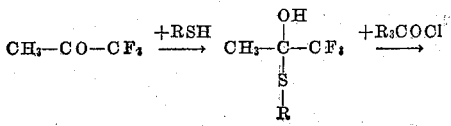

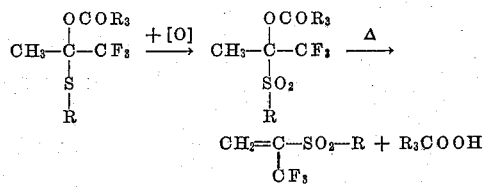

wherein R is above defined and $R_3$ is an alkyl group containing preferably from 1 to 3 carbon atoms. The temperature of the reaction for the various steps varies considerably. For example, the alkylmercaptan addition to the fluoroacetone is carried out in an ice bath, the addition of and the reaction with the acid chloride is started at low temperatures and gradually raised to reflux temperature, the oxidation step with, for example, hydrogen peroxide is carried out at about from 50°–70° C., while the pyrolysis step can vary from about 475° to 550° C. Variable pressure conditions can be employed, but preferably the reactions are conducted as described hereinafter in the examples. A continuous process wherein the reactants are added continuously or in increments in separate reaction zones and the reacted mixture is continuously removed and the unprolyzed product isolated can also be used. The pyrolysis step is conducted separately. The proportions of the principal reactants can vary so that a slight excess of one or another may be present, but advantageously approximately molecular equivalents are employed. The hydrogen halide is preferably dry hydrogen chloride.

Suitable intermediate fluoroacetones include monofluoroacetone, 1,1-difluoroacetone, 1,3-difluoroacetone, 1,1,1-trifluoroacetone, 1,1,3-trifluoroacetone 1,1,1,3-tetrafluoroacetone, 1,1,3,3-tetrafluoroacetone and pentafluoroacetone. Hexafluoroacetone is not operable in the process of the invention due to the absence of hydrogen in the molecule. However, as previously mentioned, the preferred fluoroacetones are 1,1,1-trifluoroacetone, 1,1,1,3-tetrofluoroacetone and pentafluoroacetone. These particular compounds are relatively free from competitive reactions and give good yields of the desired fluoroisopropenyl alkyl ketones. Suitable alkylmercaptans include methylmercaptan, ethylmercaptan, n-propylmercaptan, isopropylmercaptan, n-butylmercaptan, etc. Suitable carboxylic acid halides include acetyl chloride, propionyl chloride, butyryl chloride, etc. Suitable oxidizing agents include various peroxides but preferably hydrogen peroxide. Advantageously, the oxidation step is carried out in a medium of glacial acetic acid.

The polymerizations of the new compounds of the invention alone with themselves or with one or more other unsaturated, polymerizable monomers containing a —CH=C< group, but preferably a vinyl group $CH_2=CH$—, are accelerated by heat, by actinic light and by polymerization catalysts which are known to promote the polymerization of vinyl and other unsaturated organic compounds, for example, peroxides such as benzoyl peroxide, acetyl peroxide, tertiary butyl hydroperoxide, hydrogen peroxide, etc., persulfates such as ammonium persulfate, sodium persulfate, potassium persulfate, persulfuric acid, etc., perborates such as ammonium perborate, sodium perborate, potassium perborate, etc., the water-soluble salts of perphosphoric acid, boron trifluoride, and the like. Since the new compounds of the invention contain two electron attracting groups on the same carbon atom, they may also be polymerized by basic catalysts such as pyridine or triethyl phosphite. The organic peroxide catalysts are especially suitable. Mixtures of catalysts can be employed. An activating agent such as sodium bisulfite, sodium metabisulfite, etc. can be used, if desired, in conjunction with the polymerization catalysts. Also chain regulators can also be used such as an alkyl mercaptan such as hexyl, octyl, lauryl, dodecyl, myristyl mercaptans, etc. Ordinarily, the polyerization catalyst is employed in a quantity of about from 0.01 to 3%, preferably from 0.2 to 2.0%, based on the total weight of the monomers to be polymerized. The activating agent and chain regulator are present in amount of about the same order as the polymerization catalyst.

The polymerizations can be carried out in mass or dispersed in a nonsolvent for the monomers, the particles of dispersed monomer being very small (emulsion) or relatively large (bead or granular). For emulsion polymerization, any nonsolvent for the monomers can be employed, water being especially advantageous. The monomer or mixture of monomers can be advantageously emulsified in the water using emulsifying agents such as salts of higher fatty acids (e. g., sodium or potassium stearate, palmitate, etc.), ordinary soaps, salts of higher fatty alcohol sulfates (e. g., sodium or potassium acetyl sulfate, sodium or potassium lauryl sulfate, sodium or potassium stearyl sulfate, etc.) salts of aromatic sulfonic acids (e. g. sodium or potassium salts of alkylnaphthalene sulfonic acids, etc.) and higher molecular weight quaternary ammonium salts (e. g., dimethylbenzylphenyl ammonium chloride, etc.). For bead or granular polymerization relatively poor dispersing agents such as starch, methylated starch, gum arabic polyvinyl alcohol, partly hydrolyzed polyvinyl acetate, gelatin sodium glycolate and finely divided magnesium carbonate, etc., can be employed. Mixtures of dispersing agents can be used. In the polymerizations wherein the monomers are dispersed in nonsolvents, the dispersions can be facilitated by stirring, shaking or tumbling the polymerization mixtures. Continuous methods of polymerization can also be employed.

Suitable other unsaturated, polymerizable compounds for preparing the copolymers of the invention include preferably those containing the basic $CH_2=CH-$ group, for example, vinyl esters of carboxylic acids (e. g., vinyl acetate, vinyl butyrate, vinyl stearate, vinyl trifluoroacetate, vinyl benzoate, etc.) vinyl alkyl ketones (e. g., methyl vinyl ketone, ethyl vinyl ketone, trifluoromethyl vinyl ketone, etc.), vinyl alkyl ethers (e. g., methyl vinyl ether, butyl vinyl ether, etc.), vinyl sulfonamides (e. g., vinyl sulfonamide, N-methyl vinyl sulfonamide, etc.), vinyl halides (e. g., vinyl chloride, vinyl bromide, and vinyl fluoride), vinyl alkyl sulfones (e. g., vinyl methyl sulfone, vinyl ethyl sulfone, etc.), vinyl urethanes (e. g., vinyl methyl urethane, vinyl ethyl urethane, etc.), cyclic vinyl imides (e. g., vinyl succinimide, vinyl phthalimide, etc.), acrylic acid and its anhydride, amide, N-alkyl amide, nitrile, and the methyl, ethyl, butyl, benzyl and phenyl esters thereof, butadiene, etc. Still other suitable unsaturated, polymerizable compounds which can be copolymerized with our new monomers include methacrylic acid and its anhydride, amide, N-alkyl amides, nitrile, and the methyl, ethyl, butyl, benzyl and phenyl esters, vinylidene dichloride, vinylidene chloride-fluoride, alkyl esters of maleic and fumaric acids such as methyl maleate, methyl fumarate, fumaronitrile, cis- and trans-β-cyano and carboxamido-methyl acrylate, and the like.

The copolymers of the invention can contain variable amounts of each comonomer and are obtained with starting polymerization mixtures containing from 25 to 75% by weight of the new unsaturates and from 75 to 25% by weight of the above mentioned other unsaturated organic compounds. The copolymers have been found to contain substantially the same proportion of substituents as employed in the polymerization mixtures. The temperature of the polymerizations can be varied widely. Where a polymerization activating agent is employed, the polymerization will take place at a temperature as low as 0° C., and where a basic polymerization is employed the temperature can be even lower. However, the preferred temperature range for the polymerizations with peroxide catalysts is from 25° C. to 130° C.

The following examples will serve to illustrate further our new unsaturated compounds, polymers thereof, and the manner of preparing the same.

*Example 1*

Into a mixture of 112 g. (1.0 mol.) of 1,1,1-trifluoroacetone and 48 g. (1.0 mol.) of methylmercaptan, dry hydrogen chloride was bubbled for one minute and the mixture was allowed to stand in an ice bath for 16 hours. Then 79 g. (approx. 1.0 mol.) of acetyl chloride was added cautiously, after which the mixture was refluxed for 30 minutes. The unreacted acetyl chloride was removed in vacuo and the residue was dissolved in 500 cc. of glacial acetic acid, and oxidized by the addition of 115 g. (equiv. to approx. 1.0 mol. of $H_2O_2$) of 30% hydrogen peroxide, the temperature being maintained at 60° C. After destroying the excess of peroxide, the solvent and other volatile materials were removed in vacuo and the residue then refluxed with 100 cc. of acetic anhydride for 30 minutes. The acetic acid and acetic anhydride were removed under reduced pressure and the residue was pyrolyzed over glass beads at 510° C. From the reaction product, there were isolated 110 g. (approx. 0.63 mol.) of 1,1,1-trifluoroisopropenyl methyl sulfone, B. P. 110°–115° C./5 mm. pressure.

In place of the methylmercaptan, there may be substituted in the above example an equivalent amount of ethylmercaptan to give 1,1,1-trifluoroisopropenyl ethyl sulfone, or an equivalent amount of n-propylmercaptan to give 1,1,1-trifluoroisopropenyl n-propyl sulfone, or an equivalent amount of n-butylmercaptan to give 1,1,1-trifluoroisopropenyl n-butyl sulfone.

*Example 2*

Into a mixture of 130 g. (1.0 mol.) of 1,1,1,3-tetrafluoroacetone and 48 g. (1.0 mol.) of methylmercaptan, dry hydrogen chloride was bubbled for one minute and the mixture was allowed to stand in an ice bath for 16 hours. Then 79 g. (approx. 1.0 mol.) of acetyl chloride was added cautiously, after which the mixture was refluxed for 30 minutes. The unreacted acetyl chloride was removed in vacuo and the residue was dissolved in 500 cc. of glacial acetic acid, and oxidized by the addition of 115 g. (equiv. to approx. 1.0 mol. of $H_2O_2$) of 30% hydrogen peroxide, the temperature being maintained at 60° C. After destroying the excess of peroxide, the solvent and other volatile materials were removed in vacuo and the residue then refluxed with 100 cc. of acetic anhydride for 30 minutes. The acetic acid and acetic anhydride were removed under reduced pressure and residue was pyrolyzed over glass beads at 510° C. From the reaction product, there were isolated a good yield of 1,1,1,3-tetrafluoroisopropenyl methyl sulfone, B. P. 105°–110° C./6 mm. pressure.

In place of the methylmercaptan, there may be substituted an equivalent amount of ethylmercaptan to give 1,1,1,3-tetrafluoroisopropenyl ethyl sulfone, or an equivalent of n-butyl-mercaptan to give 1,1,1,3-tetrafluoroisopropenyl n-butyl sulfone.

*Example 3*

Hydrogen chloride was bubbled into a mixture of 148 g. (1 mol.) of pentafluoroacetone and 48 g. (1.0 mol.) of methyl mercaptan for one minute and the mixture was allowed to stand in an ice bath for 18 hours. Then 78.5 g. (approx. 1.0 mol.) of acetyl chloride was added continuously to this mixture and refluxed over a period of 30 minutes. The excess acetyl chloride was removed in vacuo and residue was dissolved in 500 cc. of glacial acetic acid, and oxidized with 115 g. of 30% hydrogen peroxide at 60° C. After completion of the reaction, the excess hydrogen peroxide was destroyed, and the solvents were removed by distilling under reduced pressure. The residue obtained was then treated with 100 g. of acetic anhydride on a steam bath for 2 hours. After removing acetic anhydride and acetic acid, the residue was pyrolyzed over glass beads at 525° C. From the pyrolyzed reaction mixture, there were isolated 145 g. (approx. 0.69 mol.) of pentafluoroisopropenyl methyl sulfone, B. P. 100°–105° C./5 mm. pressure In place of the methylmercaptan there may be substituted in the above example an equivalent amount of ethylmercaptan to give pentafluoroisopropenyl ethyl sulfone, or an equivalent amount of isopropylmercaptan to give pentafluoroisopropenyl isopropyl sulfone, or an equivalent amount of tert. butylmercaptan to give pentafluoroisopropenyl tert. butyl sulfone.

Example 4

10 g. of 1,1,1-trifluoroisopropenyl methyl sulfone dissolved in 25 cc. of pentane was treated with 0.1 g. of triethyl phosphite at −20° C. A violent reaction occurred and a hard, glossy homopolymer was formed. It was soluble in acetone and was moldable into stable shaped articles.

In place of the 1,1,1-trifluoroisopropenyl methyl sulfone, there may be substituted a like amount of any other of the mentioned fluoroisopropenyl alkyl sulfones, for example, 1,1,1-trifluoroisopropenyl ethyl sulfone, 1,1,1,-trifluoroisopropenyl n-propyl sulfone, 1,1,1,3-tetrafluoroisopropenyl methyl sulfone, 1,1,1,3-tetrafluoroisopropenyl ethyl sulfone, 1,1,1,3-tetrafluoroisopropenyl n-butyl sulfone, pentafluoroisopropenyl methyl sulfone or pentafluoroisopropenyl ethyl sulfone. All of these homopolymers are hard, glassy materials which are soluble in acetone and readily moldable.

Example 5

10 g. of pentafluoroisopropenyl methyl sulfone and 0.2 g. of benzoyl peroxide were sealed together in a glass tube and heated at 85° C. for 48 hours. The resultant homopolymer was acetone soluble and was nonflammable.

In place of the pentafluoroisopropenyl methyl sulfone, there may be substituted in the above example a like amount of any other of the mentioned fluoroisopropenyl alkyl sulfones, for example, such as those mentioned in Example 4 to give corresponding homopolymers having generally similar properties.

Example 6

10 g. of 1,1,1-trifluoroisopropenyl methyl sulfone, 10 g. of styrene and 0.2 g. of benzoyl peroxide were sealed together in a tube and heated at 85° C. for 48 hours. The resultant hard polymer was readily molded to shaped articles.

In place of the 1,1,1-trifluoroisopropenyl methyl sulfone, there may be substituted in the above example a like amount of 1,1,1,3-tetrafluoroisopropenyl methyl sulfone to give a generally similar moldable copolymer.

Example 7

4 g. of 1,1,1-trifluoroisopropenyl methyl sulfone, 10 g. of acrylonitrile, 0.28 g. of ammonium persulfate and 0.28 g. of sodium bisulfite were added to 100 cc. of distilled water. Polymerization began immediately and was complete in 9 hours. The polymer precipitated from the solution as it formed and was isolated by filtration, after which is was washed and dried. Analysis indicated that a copolymer had been obtained which consisted of approximately 28% by weight of the above sulfone compound, the remainder being acrylonitrile. It was soluble in dimethylformamide and could be spun into fibers having a softening point above 200° C.

In place of the 1,1,1-trifluoroisopropenyl methyl sulfone, there may be substituted a like amount of 1,1,1,3-tetrafluoroisopropenyl methyl sulfone, or a like amount of pentafluoroisopropenyl methyl sulfone, or a like amount of 1,1,1-trifluoroisopropenyl ethyl sulfone, or a like amount of 1,1,1-trifluoroisopropenyl n-propyl, or a like amount of 1,1,1-trifluoroisopropenyl n-butyl sulfone to give generally similar copolymers that are particularly useful for preparing heat resistant, tough fibers.

Example 8

5 g. of 1,1,1-trifluoroisopropenyl methyl sulfone, 5 g. of methyl methacrylate and 0.2 g. of benzoyl peroxide were sealed together in a glass tube and heated at 80° C. for 24 hours. The resultant copolymer contained approximately 50% by weight of the above sulfone compound, the remainder being methyl methacrylate. It was soluble in acetone and could be extruded or injection molded into stable shaped articles.

In place of the 1,1,1-trifluoroisopropenyl methyl sulfone, there may be substituted in the above example a like amount of 1,1,1,3-tetrafluoroisopropenyl methyl sulfone to give a generally similar moldable copolymer.

Example 9

5 g. of pentafluoroisopropenyl methyl sulfone, 5 g. of ethyl acrylate and 0.2 g. of benzoyl peroxide were heated together in a sealed tube for 48 hours at 80° C. The resultant copolymer contained approximately 50% by weight of the above sulfone compound, the remainder being ethyl acrylate. It was soluble in acetone and could be molded.

Example 10

10 g. of pentafluoroisopropenyl methyl sulfone, 10 g. of styrene and 0.4 g. of benzoyl peroxide were heated together for 48 hours at 85° C. The resultant copolymer contained approximately equal quantities by weight of the above sulfone compound and styrene. It was a clear, hard material which could be readily injection molded.

In the above example, instead of employing equal parts by weight of the sulfone compound and styrene, there may be used, for example, 5 g. of the pentafluoroisopropenyl methyl sulfone and 15 g. of styrene to give a copolymer consisting of approximately 25% by weight of the said sulfone compound and 75% by weight of styrene, or there may be used 15 g. of the pentafluoroisopropenyl methyl sulfone and 5 g. of styrene to give a copolymer consisting of approximately 75% by weight of the said sulfone compound and 25% by weight of styrene. These copolymers are likewise clear, hard materials which are readily injection molded into heat stable, nonflammable articles.

By proceeding as set forth in the above examples, other resinous copolymers can be prepared, for example, copolymers containing any proportions coming within the specified limits of from 25 to 75% by weight of any of the mentioned fluoroisopropenyl alkyl sulfones and from 75 to 25% by weight of any of the mentioned other unsaturated, polymerizable comonomers. Thus, in any of the examples the sulfone compound of the invention may be 25%, 35%, 45%, 55%, 65% or 75% by weight and the mentioned comonomer may be 75%, 65%, 55%, 45%, 35% or 25% by weight, respectively.

All of the homopolymers and copolymers of the invention are soluble in one or more common solvents such as acetone, acetonitrile, dimethylformamide, dimethylacetamide, γ-butyrolactone, N-methyl-2-pyrrolidone, ethylene, cyanohydrin, and the like. From their dopes or solutions in solvents of this kind, the polymers can be extruded, for example, through a suitable spinneret into a cabinet or cell where the solvent is evaporated off to give monofilaments which can be spun to yarn. Wet spinning processes are also operable. Such viscous dopes can also be coated on a film-forming surface of, for example, metal or glass, the solvent evaporated and the resultant film stripped from the film-forming surface. Films or sheets of this kind are useful for making flexible photographic supports. Both the molding compositions and the dope compositions may, if desired, contain modify-

What I claim is:
1. A fluoroisopropenyl alkyl sulfone having the general formula:

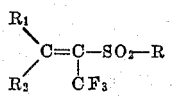

wherein R represents an alkyl group containing from 1 to 4 carbon atoms, and $R_1$ and $R_2$ each represents a member selected from the group consisting of an atom of hydrogen and a fluorine atom.

2. 1,1,1-trifluoroisopropenyl methyl sulfone.
3. Pentafluoroisopropenyl methyl sulfone.
4. 1,1,1,3-tetrafluoroisopropenyl methyl sulfone.
5. 1,1,1-trifluoroisopropenyl ethyl sulfone.
6. Pentafluoroisopropenyl ethyl sulfone.
7. A polymer of a fluoroisopropenyl alkyl sulfone having the general formula:

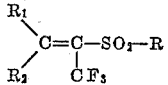

wherein R represents an alkyl group containing from 1 to 4 carbon atoms, and $R_1$ and $R_2$ each represents a member selected from the group consisting of an atom of hydrogen and a fluorine atom.

8. A copolymer of from 25 to 75% by weight of 1,1,1-trifluoroisopropenyl methyl sulfone and from 75 to 25% by weight of acrylonitrile.
9. A copolymer of from 25 to 75% by weight of 1,1,1-trifluoroisopropenyl methyl sulfone and from 75 to 25% by weight of styrene.
10. A copolymer of from 25 to 75% by weight of 1,1,1-trifluoroisopropenyl methyl sulfone and from 75 to 25% by weight of methyl methacrylate.
11. A copolymer of from 25 to 75% by weight of pentafluoroisopropenyl methyl sulfone and from 75 to 25% by weight of acrylonitrile.
12. A copolymer of from 25 to 75% by weight of pentafluoroisopropenyl methyl sulfone and from 75 to 25% by weight of styrene.

References Cited in the file of this patent
UNITED STATES PATENTS

| | | |
|---|---|---|
| 2,505,366 | Schoene | Apr. 25, 1950 |
| 2,554,576 | Landau | May 29, 1951 |

OTHER REFERENCES

Rothstein: J. Chem. Soc., 1934, 684–687. Copy in Library.